United States Patent
Agarwalla et al.

(10) Patent No.: US 11,687,943 B2
(45) Date of Patent: Jun. 27, 2023

(54) ELECTRONIC TRANSACTION DATA PROCESSING SYSTEMS AND METHODS

(71) Applicant: Mastercard International Incorporated, Purchase, NY (US)

(72) Inventors: Sachin Kumar Agarwalla, Miami, FL (US); Shweta Gupta, Jersey City, NJ (US)

(73) Assignee: Mastercard International Incorporated, Purchase, NY (US)

( * ) Notice: Subject to any disclaimer, the term of this patent is extended or adjusted under 35 U.S.C. 154(b) by 634 days.

(21) Appl. No.: 16/251,787

(22) Filed: Jan. 18, 2019

(65) Prior Publication Data

US 2019/0228412 A1   Jul. 25, 2019

(30) Foreign Application Priority Data

Jan. 22, 2018   (SG) .......................... 10201800546X

(51) Int. Cl.
*G06Q 20/40* (2012.01)
*G06Q 30/0601* (2023.01)
*G06F 16/23* (2019.01)
*G06F 16/2455* (2019.01)
*G06Q 20/12* (2012.01)

(52) U.S. Cl.
CPC ....... *G06Q 20/407* (2013.01); *G06F 16/2379* (2019.01); *G06F 16/2455* (2019.01); *G06Q 20/12* (2013.01); *G06Q 30/0633* (2013.01)

(58) Field of Classification Search
CPC .. G06Q 20/407; G06Q 20/12; G06Q 30/0633; G06F 16/2379; G06F 16/2455

USPC ...................................................... 705/39, 67
See application file for complete search history.

(56) References Cited

U.S. PATENT DOCUMENTS

| | | | |
|---|---|---|---|
| 7,082,415 B1 * | 7/2006 | Robinson | G06Q 20/4014 705/67 |
| 9,245,261 B2 | 1/2016 | Anand | |
| 9,355,391 B2 | 5/2016 | Von Behren et al. | |
| 2002/0026416 A1 * | 2/2002 | Provinse | G06Q 40/128 705/39 |
| 2012/0235301 A1 | 9/2012 | Ni et al. | |
| 2014/0006198 A1 | 1/2014 | Daly et al. | |
| 2016/0321661 A1 * | 11/2016 | Hammond | G06Q 20/407 |

OTHER PUBLICATIONS

"SWAPEROO: A Simple Wallet Architecture for Payments, Exchanges, Refunds, and Other Operations," by Neil Daswani; Neil Boneh; Hector Garcia-Molina; Steven Ketchpel; and Andreas Paepcke. Proceedings of the 3rd Usenix Workshop on Electronic Commerce. Boston, Massachusetts, Aug. 31-Sep. 3, 1998. (Year: 1998).*

* cited by examiner

*Primary Examiner* — Sara C Hamilton
(74) *Attorney, Agent, or Firm* — Baker Botts L.L.P.

(57) ABSTRACT

A data processing system for reconciling electronic transaction data is disclosed. The data processing system comprises: a computer processor and a data storage device, the data storage device storing instructions operative by the processor to: receive refund transaction data indicating a refund transaction, the refund transaction data comprising an indication of an original transaction and an indication of a refund amount; look up original transaction data for the original transaction in a payment transaction database; generate reconciled transaction data from the refund transaction data and the original transaction data; and provide the reconciled transaction data to a user device.

18 Claims, 8 Drawing Sheets

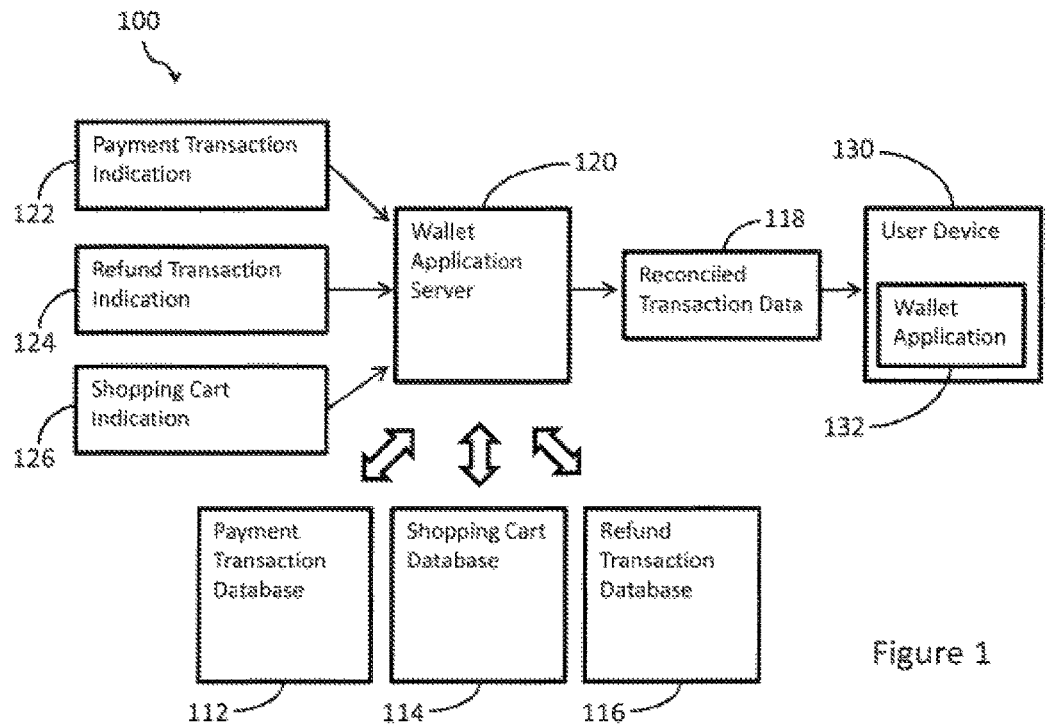
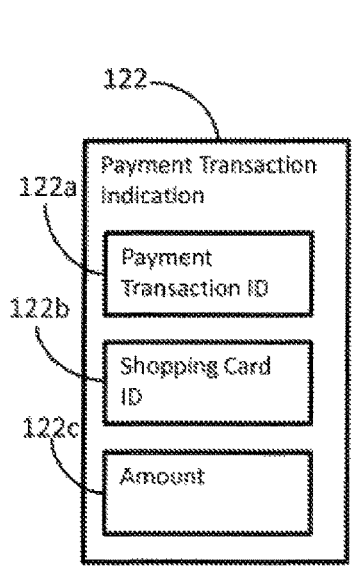
Figure 2A
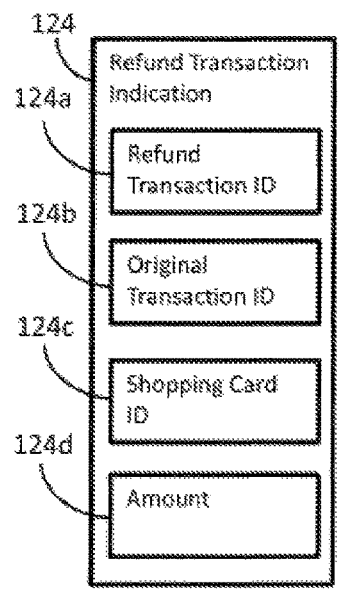
Figure 2B
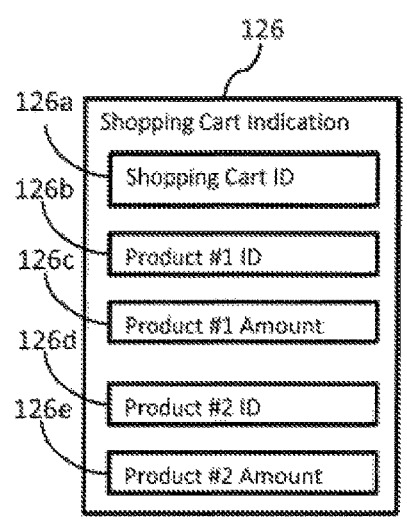
Figure 2C

ELECTRONIC TRANSACTION DATA PROCESSING SYSTEMS AND METHODS

CROSS-REFERENCE TO RELATED APPLICATIONS

This application claims priority to Singapore Patent Application No. 10201800546X filed on Jan. 22, 2018, which is hereby incorporated by reference in its entirety.

FIELD OF THE INVENTION

The present disclosure relates to systems and methods for processing electronic transaction data and more specifically to the reconciliation of refund transaction data.

BACKGROUND OF THE INVENTION

Electronic payment transactions are becoming increasingly widespread. Many financial institutions such as banks provide internet or smart phone app based account management systems which allow consumers to view details of electronic transactions on-line. Such account management systems may be provided for payment card accounts of for payment wallets. Generally, when transaction data is provided to consumers, only one entry for each transaction is shown. When purchased items are returned by a consumer and a refund transaction is made, it can be difficult for the consumer to match the refund transaction with the original transaction. This is particularly the case when the original transaction included several items and the refund transaction does not include all of the items in the original transaction.

U.S. Pat. No. 9,355,391 describes a digital wallet that receives and stores receipts. The receipts include details of purchased items. The wallet application allows searching and analysis of information from the receipts. There is no disclosure of refund transactions or how to process receipts for refund transactions.

U.S. Pat. No. 9,245,261 describes a system which analyses receipt information provided by a point of sale device. The system allows a customer to identify if products have been recalled by a manufacturer. There is no discussion of how a refund transaction could be reconciled with the corresponding original transaction.

US Patent Application Publication US2002/0026416 describes a system which matches tickets with receipts for managing expenses. While refund transactions are considered in this document, they have to be manually entered by a user which is time consuming and inefficient.

US Patent Application Publication US2012/0235301 describes a system which extracts purchase related information from received emails. The document does not consider refund transactions and there is no suggestion of how refund transactions could be matched with payment transactions.

US Patent Application Publication US2014/006198 describes a system for tracking financial transactions. Receipt information is stored in a database and the database is used to analyse the financial transactions. The document does not consider refund transactions and there is no suggestion of how refund transactions could be matched with payment transactions.

None of the above referenced systems describe how to reconcile refund transactions in an efficient manner.

SUMMARY OF THE INVENTION

In accordance with a first aspect of the present invention there is provided A data processing system for reconciling electronic transaction data. The data processing system comprises: a computer processor and a data storage device, the data storage device storing instructions operative by the processor to: receive refund transaction data indicating a refund transaction, the refund transaction data comprising an indication of an original transaction and an indication of a refund amount; look up original transaction data for the original transaction in a payment transaction database; generate reconciled transaction data from the refund transaction data and the original transaction data; and provide the reconciled transaction data to a user device.

In an embodiment, the refund transaction data further comprises an indication of a refunded item, and wherein the original transaction data comprises an indication of purchased items, and wherein the data storage device further comprises instructions operative by the processor to generate the reconciled transaction data from the refund transaction data and the original transaction data by matching the refunded item with a corresponding item from the purchased items.

In an embodiment, the refund transaction data further comprises an indication of a value associated with the refunded item, and wherein the original transaction data further comprises indications of values associated with each of the purchased item, and wherein the data storage device further comprises instructions operative by the processor to generate reconciled transaction data from the refund transaction data and the original transaction data by calculating an offset between the value associated with the refunded item and the value associated with the corresponding item from the purchased items.

In an embodiment, the indication of purchased items comprises a shopping cart identifier and wherein the data storage device further comprises instructions operative by the processor to use the shopping cart identifier to look up product identifiers for the purchased items in a shopping cart database.

In an embodiment, the data storage device further comprises instructions operative by the processor to store the refund transaction data in a refund transaction database.

In an embodiment, the refund transaction data comprises an indication of a refunded item, and wherein the data storage device further comprises instructions operative by the processor to store an indication of a product identifier for the refunded item with a shopping cart identifier in a shopping cart database and to store an indication of the shopping cart identifier with an indication of the refund transaction in the refund transaction database.

In an embodiment, the data storage device further comprises instructions operative by the processor to receive the refund transaction data by accessing an application programming interface provided by a merchant server.

In an embodiment, the data storage device further comprises instructions operative by the processor to receive original transaction data for the original transaction and to store the original transaction data in the payment transaction database.

According to a second aspect of the present disclosure there is provided a data processing method for reconciling refund transaction data. The method comprises: receiving payment transaction data indicating a payment transaction; storing the payment transaction data in a payment transaction database; receiving refund transaction data indicating a refund transaction, the refund transaction data comprising an indication of the payment transaction and an indication of a refund amount; looking up payment transaction data in the payment transaction database; generating reconciled transaction data from the refund transaction data and the payment transaction data; and providing the reconciled transaction data to a user device.

Embodiments of the invention may be implemented as a network of communicating devices (i.e. a "computerized network"). Further embodiments comprise a software application downloadable into a computer device to facilitate the method. The software application may be a computer program product, which may be stored on a non-transitory computer-readable medium on a tangible data-storage device (such as a storage device of a server, or one within a user device).

BRIEF DESCRIPTION OF THE DRAWINGS

Embodiments of the invention will now be described by way of example only with reference to the following drawings, in which:

FIG. 1 is a block diagram showing a system for processing electronic transaction data according to an embodiment of the present invention;

FIG. 2A shows the data included in a payment transaction indication in embodiments of the present invention;

FIG. 2B shows the data included in a refund transaction indication in embodiments of the present invention;

FIG. 2C shows the data included in a shopping cart transaction indication in embodiments of the present invention;

DETAILED DESCRIPTION OF CERTAIN EMBODIMENTS

Figure 3:
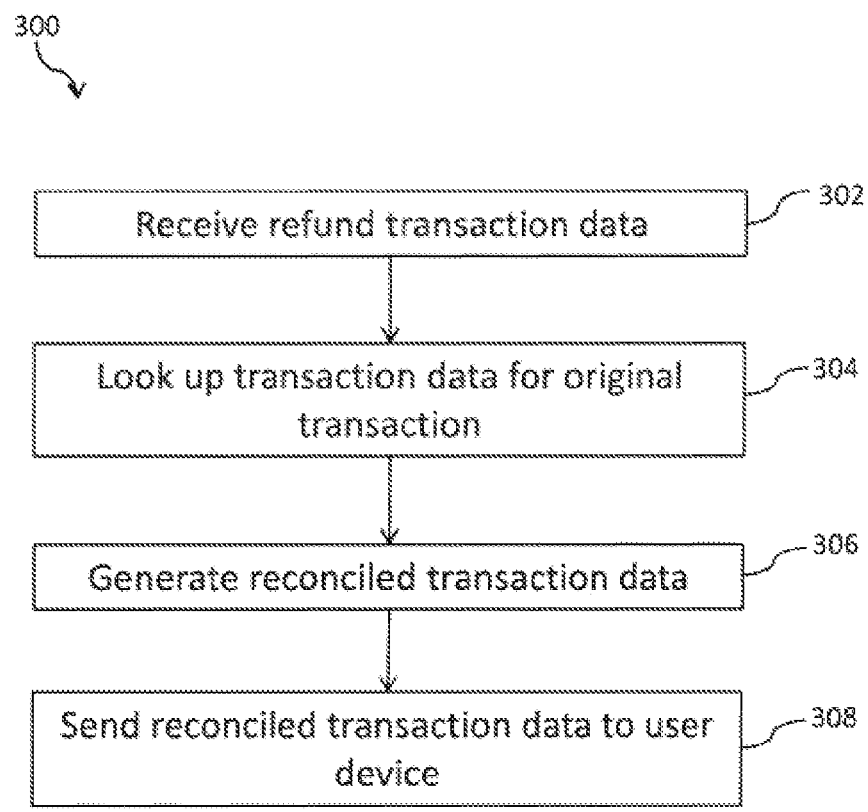
FIG. 3 is a flowchart showing a method of processing electronic payment data according to an embodiment of the present invention.

FIG. 1 is a block diagram showing a system for processing electronic transaction data according to an embodiment of the present invention. The system 100 comprises a wallet application server 110 which is coupled to a payment transaction database, a shopping cart database 114 and a refund transaction database 116. The wallet application server 110 may be a server associated with a mobile wallet application which stores details for payment cards associated with a user such as Apple Pay, Samsung Pay or Android Pay, alternatively, the wallet application server 110 may be associated with a digital wallet application such as Masterpass provided by Mastercard, or may be associated with an individual wallet provider such as paytm. The wallet application server 110 receives payment transaction indications 122, refund transaction indications 124 and shopping cart indications 126. The wallet application server 110 stores the payment transaction indications 122 in the payment transaction database 112, the shopping cart indications 126 in the shopping cart database 114 and the refund transaction indications 124 in the refund transaction database 116. The payment transaction indications 122, the shopping cart indications 126 and the refund transaction indications 124 are received by the wallet application server 110 from a server associated with a merchant during the processing of payment transactions with the merchant. The wallet application server 110 uses indications of original transactions included in the refund transaction indications 124 to match refund transaction indications 124 with corresponding original transactions from the payment transaction database 112. This matching process may be triggered by a user, for example by requesting account information from the wallet application server 110, or alternatively may be triggered during the generation of a statement for the wallet application or a statement for a payment card for which details are stored on the wallet application server 110.

The matched refund transactions are used by the wallet application server 110 to generate reconciled transaction data 118. The reconciled transaction data 118 is provided to a user device 130 such as a smart phone device or tablet computing device and presented to a user in a wallet application 132 running on the user device 130.

Each of the refund transaction indications 124 includes an identifier of shopping cart which allows the refunded items to be identified. Thus, the refund transactions indications 124 may include indications of refunded items. Similarly, each of the payment transaction indications 112 also includes an identifier of a shopping cart which allows the items included in the original transaction to be identified.

The shopping cart indications 122 may include indications of a value or price associated with each of the items. These values may be used in the calculation of an offset between a value associated with each item in the original payment transaction and the value associated with the matching items in the refund transaction. Thus, the reconciled transaction data allows the user to check whether the full value of each item has been refunded in the refund transaction.

The shopping cart indications 126, the payment transaction indications 122 and the refund transactions 124 are generated by a server associated with a merchant during transaction made by the user of the user device 130 using the wallet application 132. For example, the user of the user device 130 may use the wallet application 132 during an e-commerce transaction. Initially, the user selects a set of items and these are stored in a virtual shopping cart. When the user decides to check out, the wallet application server 120 provides the merchant server with the payment card details for a payment card associated with the user. In some implementations, the wallet application server 120 may provide a tokenized payment card identifier. The server associated with the merchant uses this information to generate a transaction authorization request which is sent to a server associated with an acquirer bank. The processing of the transaction is described in more detail below with reference to FIG. 4. Once the transaction is authorized, the server associated with the merchant generates a shopping cart indication 126 which may be a XML file transferred over an application program interface (API) to the wallet application server 120. The wallet application server 120 then stores the shopping cart indication 126 in the shopping cart database 114. The server associated with the merchant also generates a payment transaction indication 122 indicating the payment transaction.

If the user of the user device 130 returns one or more of the purchased items as part of a refund transaction, similar processing takes place: the server associated with the merchant initiates a refund transaction, and generates a refund transaction indication 124 which includes details of the refund transaction and the server associated with the merchant also generates a shopping cart indication 126 for the refund transaction. The shopping cart indication for the refund transaction includes indications of the item or items involved in the refund transaction.

The wallet application server 120 maintains the payment transaction database 112, the shopping cart database 114 and the refund transaction database 116. It is envisaged that the wallet application server 120 would access the three databases. In some embodiments, the wallet application server 120 may be associated with another entity in the processing of payment transactions such as a payment card issuer, a payment network, or a wallet issuer. In such scenarios, the entity associated with the wallet application server 120 may also be able to access the data stored in the payment transaction database 112, the shopping cart database 114 and the refund transaction database 116.

It is noted that the field used to match the purchase and refund transaction may be information incorporated in messages formatted according to the ISO8583 standard. Such information is populated by the issuer when it receives any authorization message (having a message type indicator 0100). The this field is populated for the approved transaction. This field is maintained throughout the lifecycle, like including events such as refunds, and chargebacks. For example for each transaction authorized via the MasterCard Network ("online-authorized transactions"), DE 38 of the First Presentment/1240 message must be populated with the same value contained in DE 38 of the related Authorization Request Response/0110 message. DE 38 indicates an approval code which is a code the authorizing institution assigns indicating approval. The DE 38 is present for all account level management transactions. DE 38 is retained and returned through all subsequent messages in the lifecycle.

FIG. 2A shows the data included in a payment transaction indication in embodiments of the present invention. The payment transaction indication 122 comprises a payment transaction identifier 122a which uniquely identifies the payment transaction. The payment transaction indication 122 further comprises a shopping cart identifier 122b which uniquely identifies a shopping cart that specifies items included in the payment transaction. The payment transaction indication 122 further comprises an amount indication 122c which indicates the value of the transaction. The payment transaction indication 122 may further comprise additional indications such as the time and date of the transaction, the merchant at which the transaction was carried out, and details of a payment card account on which the transaction was made.

FIG. 2B shows the data included in a refund transaction indication in embodiments of the present invention. The refund transaction indication 124 comprises a refund transaction indication 124a which uniquely identifies the refund transaction. The refund transaction indication 124 further comprises an indication of an original payment transaction identifier 124b which indicates the original transaction corresponds to the refund transaction. It is noted that the refund transaction may correspond to a part of an original payment transaction, for example if the original transaction related to two or more items and one of these items was refunded. The refund transaction indication 124 further comprise a shopping cart identifier 124c which indicates a shopping cart that specifies the items included in the refund transaction. The refund transaction indication 124 further comprises an amount indication 124d which indicates the value refunded by the refund transaction. As described above, the refund transaction indication 124 may further comprise additional indications such as the time and date of the transaction, the merchant at which the transaction was carried out, and details of a payment card account on which the transaction was made.

FIG. 2C shows the data included in a shopping cart transaction indication in embodiments of the present invention. The shopping cart indication 126 comprises a shopping cart identifier 126a which uniquely identifies the shopping cart. The shopping cart indication 126 further comprises indications of products and price amounts corresponding to the products. In this example, the shopping cart indication 126 comprises an identifier of a first product 126b, a price amount 126c for the first product, an identifier of a second product 126d and a price amount for the second product 126e. The shopping cart indication 126 may further comprise additional information, for example, the shopping cart indication may comprise quantity information associated with each product.

The payment transaction indication, the refund transaction indication and the shopping cart transaction indication described above in relation to FIGS. 2A to 2C may be formatted in the XML format.

FIG. 3 is a flowchart showing a method of processing electronic payment data according to an embodiment of the present invention. The method 300 is carried out by the wallet application server 110 shown in FIG. 1. In step 302, the wallet application server 110 receives refund transaction data. The refund transaction data may be received as a refund transaction indication 124 as described above with reference to FIG. 2B. The refund transaction data comprises an indication of an original transaction and an indication of a refund amount. In step 304, the wallet application server 110 looks up transaction data for an original transaction corresponding to the refund transaction in a database. Step 304 comprises using the indication of the original transaction included in the refund transaction data to look up the transaction data for the original transaction. In step 306, the wallet application server 110 generates reconciled transaction data 118 using the refund transaction data and the original transaction data. In step 308, the wallet application server 110 sends the reconciled transaction data 118 to the user device 130.

The reconciled transaction data 118 comprises links between payment transactions and their corresponding refund transactions. These links may indicate matching items in shopping carts for corresponding payment transactions and refund transactions. In some embodiments, the reconciled transaction data 118 may be generated as a static table or spreadsheet showing the linked items together in other embodiments, the reconciled transaction data may be provided as interactive table, or data that the wallet application 132 running on the user device 130 may use to generate an interactive table, for example showing the payment transactions and corresponding refund transactions initially as separate transactions, but allowing the user to select an option to see links between matching items.

Figure 4:
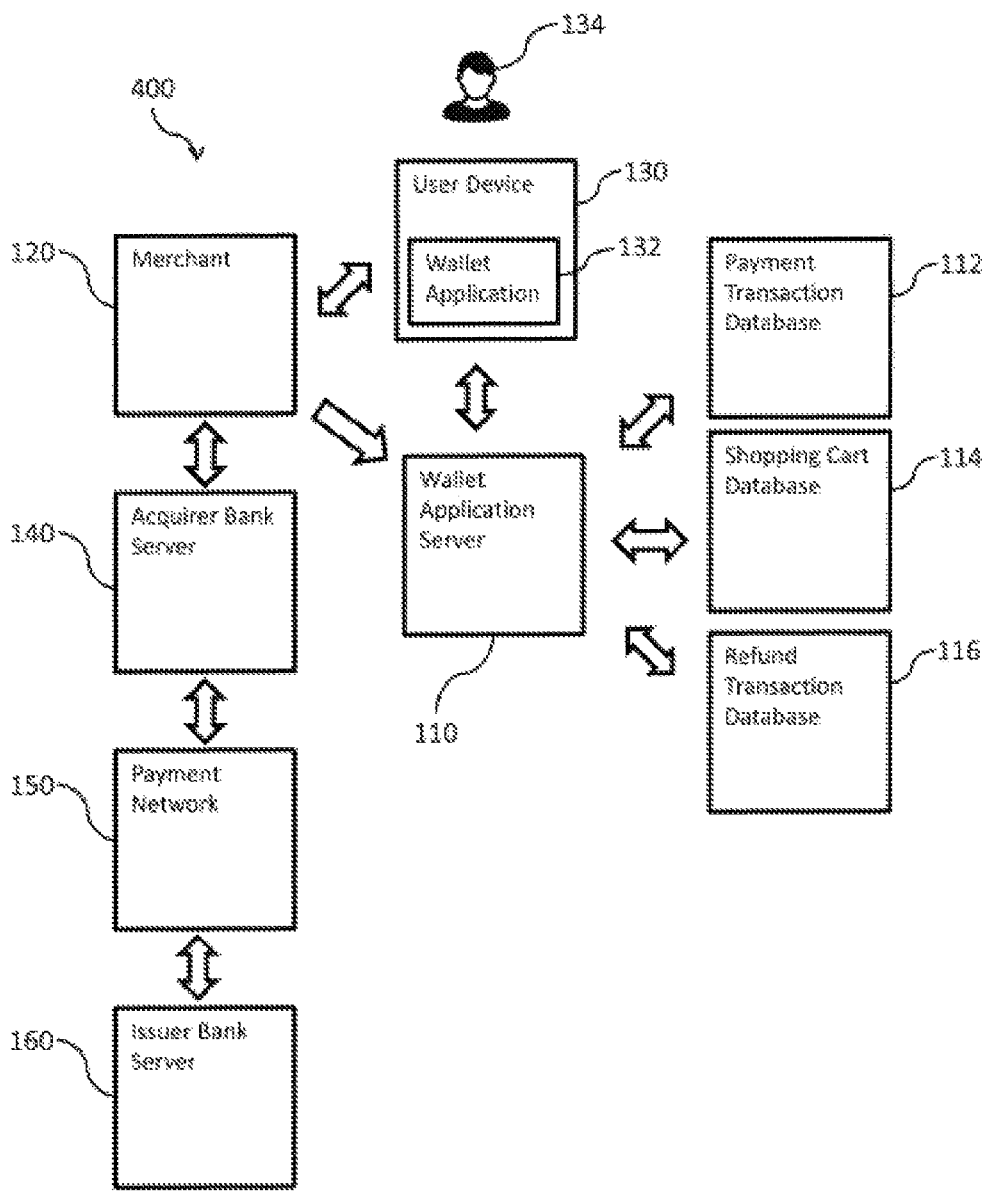
FIG. 4 is a block diagram showing a system for processing electronic transaction data according to an embodiment of the present invention.

FIG. 4 is a block diagram showing a system for processing electronic transaction data according to an embodiment of the present invention. As shown in FIG. 4, the system 400 comprises a merchant server 120, an acquirer bank server 140, a payment network 150 and an issuer bank server 160. The system further comprises a wallet application server 110 and a user device 130. The wallet application server 110 is coupled to a payment transaction database 112, a shopping cart database 114 and a refund transaction database 116. The wallet application server 110 manages the payment transaction database 112, the shopping cart database 114 and the refund transaction database 116 and as described in more detail below uses the data stored in the databases to generate reconciled transaction data. The user device 130 executes a wallet application 132. A user 134 controls the user device. The wallet application 132 stores details of one or more payment cards for the user 134.

In alternative embodiments, the wallet application server 110 may be involved in the transaction authorization process. Such embodiments may apply when the wallet application server 110 provides a digital wallet application such as Masterpass or is a wallet provider. In such embodiments, the wallet application server 110 may receive payment transaction information from the merchant server 120 as part of the transaction authorization process.

Figure 5:
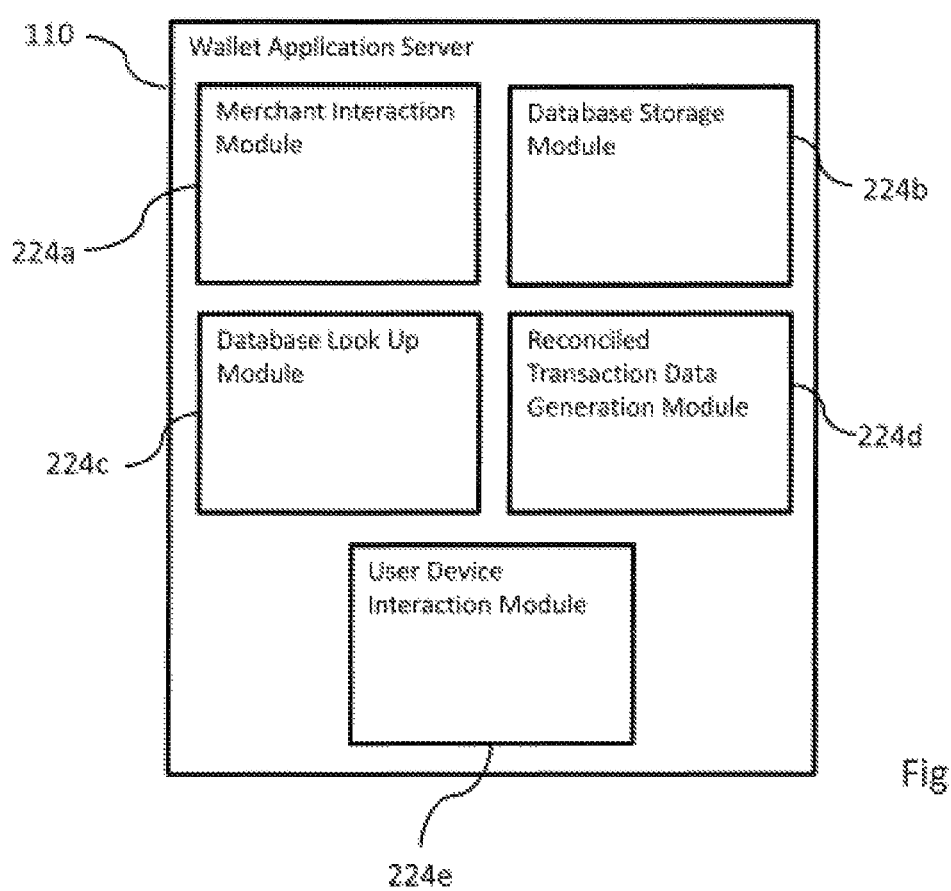
FIG. 5 is a block diagram showing the functional modules of a wallet application server according to an embodiment of the present invention.

FIG. 5 is a block diagram showing the functional modules of the wallet application server shown in FIGS. 1 and 4. As shown in FIG. 5, the wallet application server 110 comprises a merchant interaction module 224a; a database storage module 224b; a database look up module 224c; a reconciled transaction data generation module 224d; and a user device interaction module 224e. The merchant interaction module 224a is operable to interact with the merchant server 120 to send and receive information relating to payment transactions including shopping card indications, payment transaction indications and refund transaction indications. The database storage module 224b operates to store information in the databases coupled to the wallet application server 110. The database look up module 224c is operable to look up data in the databases coupled to the wallet application server 110. The reconciled transaction data generation module 224d is operable to process the data looked up from the databases and to use this data to generate reconciled transaction data. The user device interaction module 224e is operable to communicate with the user device 130 over a network, for example the internet. A technical architecture of the wallet application server 110 is described in detail below with reference to FIG. 11.

Figure 6:
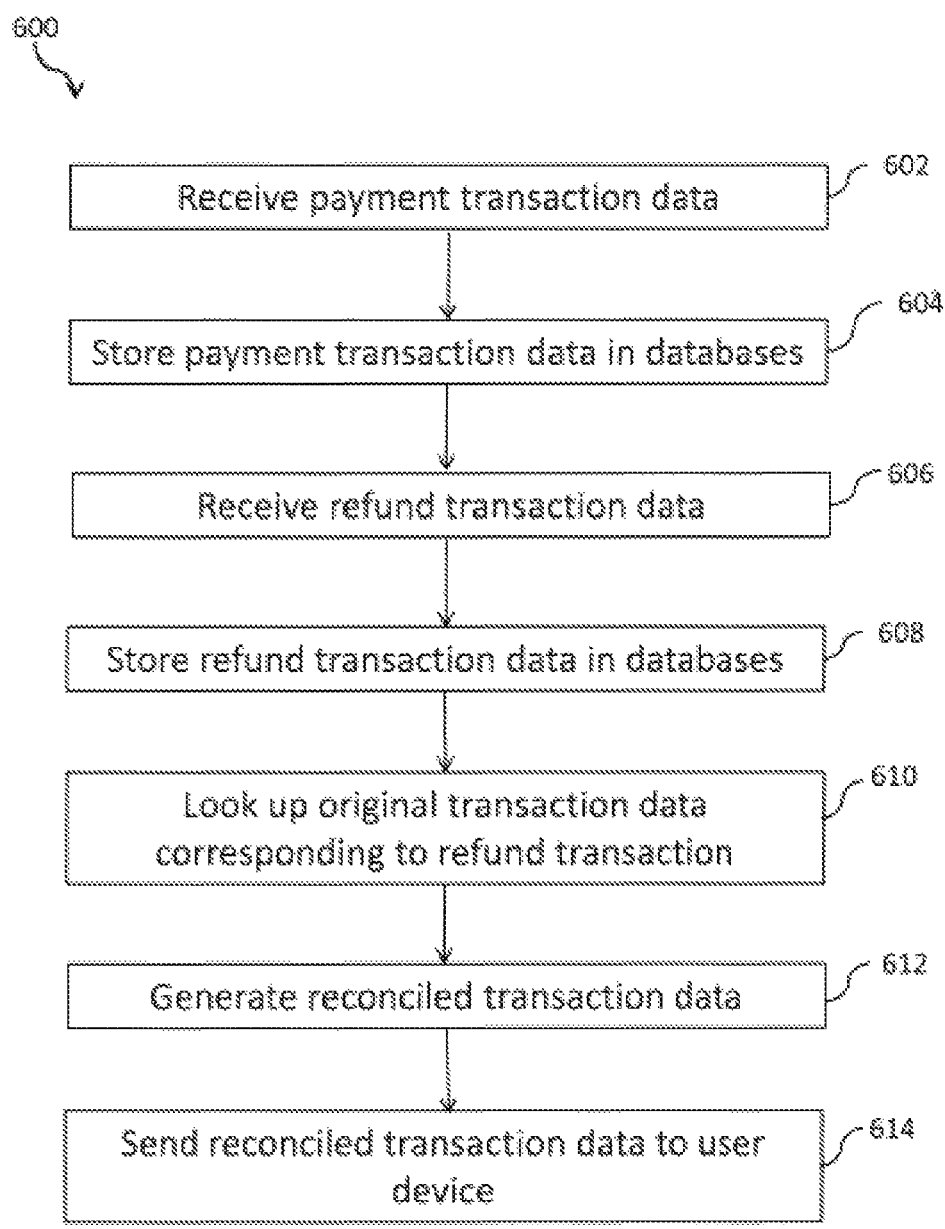
FIG. 6 is a flowchart illustrating a method of processing electronic transaction data according to an embodiment of the present invention.

FIG. 6 is a flowchart illustrating a method of processing electronic transaction data according to an embodiment of the present invention. The method 600 shown in FIG. 6 is carried out by the systems 100 and 400 shown in FIGS. 1 and 4.

Initially, the user 134 initiates a purchase at the merchant corresponding to merchant server 120 using the wallet application 132. The merchant server 120 may, for example, implement an on-line shop, in such a scenario, the user 134 selects a number of items which are added to an electronic shopping cart and then checks out. In the check-out process, the wallet application 132 running on the user device 130 provides the merchant server 120 with details of a payment card associated with the user 134.

In order to authorize a transaction from the account associated with the payment card of the user 134 and the merchant, the merchant server 120 sends details of the transaction to the acquirer bank server 140 as a transaction authorization request. These details comprise an indication of the transaction amount, an indication of the payment card associated with the user 134 and other details. It is noted here that these details do not generally include details of the actual products making up the purchase.

Upon receiving the transaction authorization request, the acquirer bank server 140 sends the transaction authorization request to the payment network 150. The payment network uses the payment card identifier to route the transaction authorization request to the issuer bank server 160. The issuer bank server 160 determines whether the transaction should be authorized. This process may comprise determining whether there is a sufficient available balance or credit associated with the payment card account and whether authentication information such as a PIN number entered by the user is correct. In response to the transaction authorization request, the issuer bank server 130 generates an authorization response. The authorization response is sent back to the acquirer bank server 140 via the payment network 140. The acquirer bank server 140 provides the authorization response to the merchant server 120.

Upon receiving the authorization response, the merchant server 120 sends a transaction confirmation to the wallet application server 110. The wallet application server 110 provides the confirmation to the wallet application 132 running on the user device 130. This confirmation comprises a payment transaction indication and a shopping cart indication.

The wallet application server 110 may receive the confirmation information comprising a payment transaction indication and a shopping cart indication by accessing an application program interface (API) provided by the merchant server 120. The merchant server 120, which may implement a payment gateway server, may provide a shopping cart API which provides shopping cart data, for example in XML format. It is noted that many on-line merchants currently provide a shopping cart API which is used in e-commerce transactions, such APIs provide details of shopping cart contents, such as item identifiers, quantity and price information. In order to use such an API in accordance with the present disclosure, an additional field indicating a transaction identifier would have to be added by the merchant server 120 to allow the shopping cart information to be matched with transaction data, and refund transaction data. The payment transaction indication may be generated by the merchant server 120. The unique number generated by the merchant server 120 for each transaction is known as a System Trace Audit Number (STAN). The STAN is a number that a message initiator assigns to uniquely identify a transaction originated by an acquirer. The STAN is stored in DE 11 and must remain unchanged for all messages associated with a given system transaction, which includes all responses and acknowledgements related to an original request message (such as authorization, file update, administrative, and network management). For example, the same DE 11 is used in an Authorization Request which has a message type indicator (MTI) 0100 and any related Authorization Request Response which has a MTI 0110, Authorization Advice with MTI 0120. Acquirer-generated, Authorization Advice with MTI 0120—System-generated, or Reversal Advice with MTI 0420—System-generated message. Alternatively, the payment transaction indication may be generated by the acquirer server 140 as part of the transaction authorization process. In such embodiments, the payment transaction indication may be in the form of an ISO8583 standard message, for example a payment transaction authorization message. The payment identifier may be a transaction reference number assigned during the transaction authorization process and stored in data elements 131 to 170 of the payment transaction authorization message. Additional information such as the identifiers of the shopping cart may be stored in private data elements of the payment transaction authorization message.

Figure 7A:
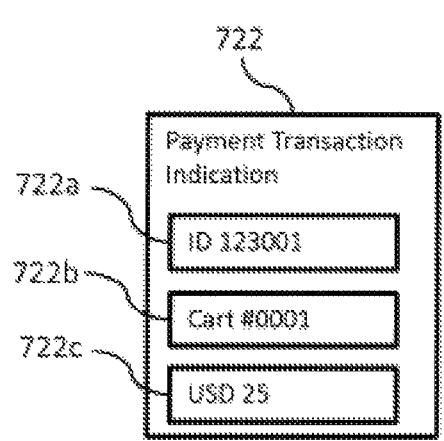
FIG. 7A shows an example of a payment transaction indication.

FIG. 7A shows an example of a payment transaction indication. In this example, the payment transaction indication 722 corresponds to a payment card transaction for USD 25. As shown in FIG. 7A, the payment transaction indication comprises a payment transaction identifier 722*a* which indicates the payment transaction "ID 123001", a shopping cart identifier 722*b* which indicates the shopping cart "Cart #0001" and a payment transaction amount indication 722*c* which indicates the amount "USD 25".

Figure 7B:
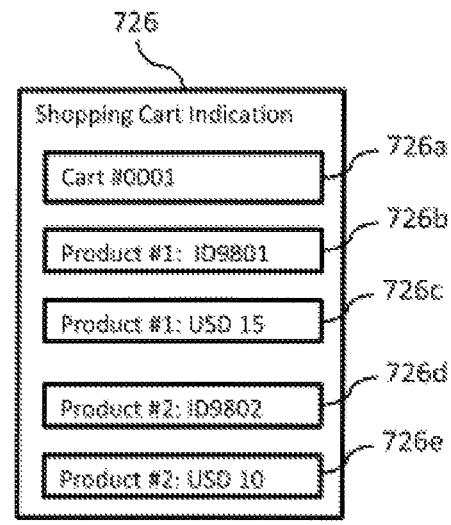
FIG. 7B shows an example of a shopping cart indication corresponding to the payment transaction indication shown in FIG. 7A.

FIG. 7B shows an example of a shopping cart indication corresponding to the payment transaction indication shown in FIG. 7A. In this example, the shopping cart indication 726 corresponds to a shopping cart for a purchase of two items. As shown in FIG. 7B, the shopping cart indication 726 comprises a shopping cart identifier 726*a* which indicates that the shopping cart is "Cart #0001", a first product identifier 726*b* which indicates that the first product identifier is "ID9801", a first product price amount indicator 726*c* which indicates that the price of the first product is "USD25", a second product identifier 726*d* which indicates that the second product identifier is "ID9802", and a second product price amount indication 726*e* which indicates that the price of the second product is "USD10".

Returning to FIG. 6, in step 602, the merchant interaction module 224*a* of the wallet application server 110 receives the payment transaction data from the merchant server 120. As described above, the merchant interaction module 224*a* of the wallet application server 110 may access an API to receive payment transaction data. The payment transaction data comprises the payment transaction indication 722 described above in relation to FIG. 7A and the corresponding shopping cart indication 726 described above in relation to FIG. 7B.

In step 604, the database storage module 224*b* of the wallet application server 110 stores the payment transaction data in databases. The database storage module 224*b* of the wallet application server 110 stores the payment transaction indication 722 in the payment transaction database 112 and stores the shopping cart indication 726 in the shopping cart database 114.

In this example, the user 134 has purchase two items: one having product identifier "ID9801" and a price of USD25 and the second having product identifier "ID9802" and a price of USD10. Now the user 134 returns the second item to the merchant and is offered a refund.

To process the refund transaction, the merchant server 120 generates a refund transaction for USD10 which is sent to the acquirer bank server 140. In an analogous manner to the original transaction, the refund transaction request is sent by the acquirer bank server 140 to the payment network 150 which in turn routes the refund transaction request to the issuer bank server 160. Thus, a refund transaction to transfer USD10 to the user's payment card account is initiated.

In addition to sending the refund transaction request to the issuer bank server 160 via the acquirer bank server 140 and the payment network, the merchant server 120 also generates a refund transaction indication and a corresponding shopping cart indication. These are described below with reference to FIGS. 8A and 8B respectively.

Figure 8A:
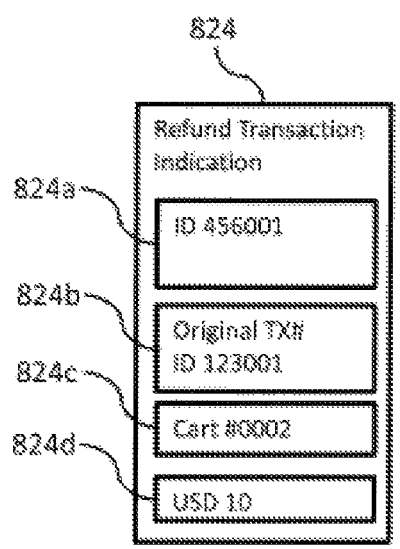
FIG. 8A shows an example of a refund transaction indication.

FIG. 8A shows an example of a refund transaction indication. As shown in FIG. 8A, the refund transaction indication 824 comprises an indication of a refund transaction identifier 824*a* which indicates the refund transaction "ID 456001"; an original transaction identifier 824*b* which indicates that the original payment transaction identifier "ID 123001"; a shopping cart identifier 824*c* which indicates that the shopping cart listing the items corresponding to the refund is "Cart #0002"; and a refund amount indicator 824*d* which indicates that the refund amount is "USD 10".

Figure 8B:
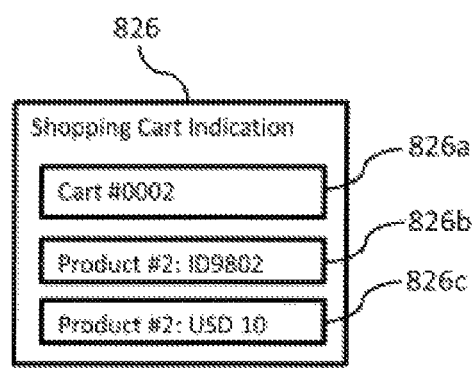
FIG. 8B shows an example of a shopping cart indication corresponding to the refund transaction indication shown in FIG. 8A.

FIG. 8B shows an example of a shopping cart indication corresponding to the refund transaction indication shown in FIG. 8A. In this example the shopping cart identifier 826 corresponds a refund for the second item in the shopping cart 726 described above in relation for FIG. 7B. As shown in FIG. 7B, the shopping cart indication 826 comprises a shopping cart identifier 826*a* which indicates that the shopping cart is "Cart #0002", a product identifier 826*b* which indicates that the product identifier of the product involved in the refund is "ID9802", and a product price amount indicator 826*c* which indicates that the price of the first product is "USD10".

Returning again to FIG. 6, in step 606, the merchant interaction module 224*a* of the wallet application server 110 receives the refund transaction data from the merchant server 120. As described above, the merchant interaction module 224*a* of the wallet application server 110 may access an API to receive refund transaction data. As described above, merchant payment gateway servers currently provide shopping cart APIs and the refund transaction data would be provided in an analogous API which would provide the refund transaction data. The refund transaction data comprises the refund transaction indication 824 described above in relation to FIG. 8A and the corresponding shopping cart indication 826 described above in relation to FIG. 8B.

In step 608, the database storage module 224*b* of the wallet application server 110 stores the refund transaction data in databases. The database storage module 224*b* of the wallet application server 110 stores the refund transaction indication 824 in the refund transaction database 116 and stores the shopping cart indication 826 in the shopping cart database 114.

Figure 9:
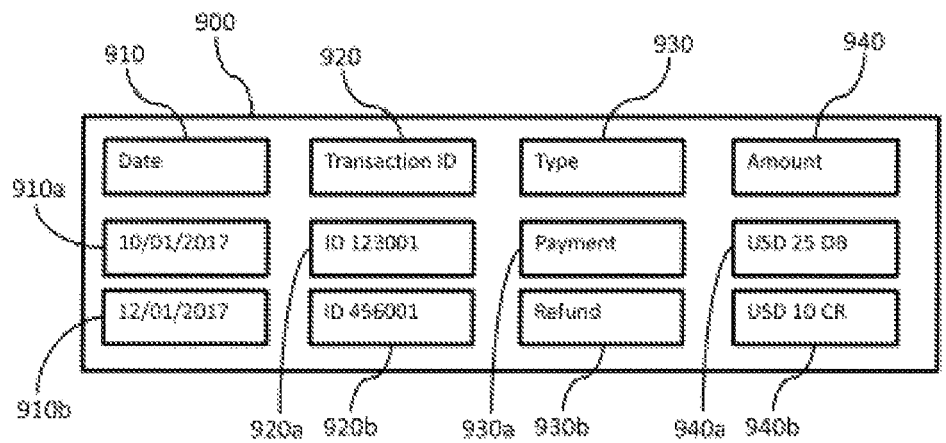
FIG. 9 shows an example of transaction data comprising a payment transaction and a refund transaction.

FIG. 9 shows an example of transaction data comprising a payment transaction and a refund transaction. As shown in FIG. 9, the transaction data 900 comprises data information 910, transaction identifier information 920, transaction type information 930 and transaction amount information 940. The transaction data 900 shown in FIG. 9 may be provided to the user 134 as part of a statement for a payment card account. The transaction data 900 shown in FIG. 9 corresponds to the payment transaction and the refund transaction described above.

The first row of the transaction data 900 indicates that the first transaction date 910*a* which shows that the first transaction was carried out on 10 Jan. 2017, the first transaction identifier 920*a* which shows that the first transaction identifier is "ID 123001", the first transaction type 930*a* which indicates that the first transaction is a payment transaction and the first transaction amount 940*a* which indicates that the amount associated with the first transaction is a debit of USD 25.

The second row of the transaction data 900 indicates that the second transaction date 910*b* which shows that the first transaction was carried out on 12 Jan. 2017, the first transaction identifier 920b which shows that the second transaction identifier is "ID 456001", the second transaction type 930b which indicates that the first transaction is a refund transaction and the second transaction amount 940b which indicates that the amount associated with the first transaction is a credit of USD 10.

It is noted that while the transaction data 900 provides information about the amounts involved in the payment transaction and the refund transaction, it does not provide the user with any way to verify that the correct amount was refunded in the refund transaction. Thus, if only the information provided in FIG. 9 is available, the user must have both the original sales receipt for the payment transaction and a receipt corresponding to the refund transaction to verify that the correct amount was refunded. In embodiments of the present invention, reconciled transaction data is generated and provided to the user which allows the user to easily verify that the correct amount has been refunded in the refund transaction.

Steps 610, 612 and 614 of the method shown in FIG. 6 relate to the generation of reconciled transaction data. These steps may be carried out in response to receiving the refund transaction data. Alternatively, the steps may be carried out in response to a user request for information, for example by the user entering a request through the wallet application 132, or the steps may be carried out in order to generate a statement for the user's payment card account at a statement date.

In step 610, the database look up module 224c of the wallet application server 110 looks up transaction data corresponding to the refund transaction. This step may be implemented by the database look up module 224c of the wallet application server 110 using the original payment transaction indicator 824b to identify the original payment transaction. Once the original payment transaction has been identified, the original payment transaction indicator 824b is used as a key to look up the payment transaction indication 722. The database look up module 224c of the wallet application server 110 also uses the shopping cart identifier 824c of the refund transaction indication 824 and the shopping cart identifier 722b from the payment transaction indication 722 to look up the corresponding shopping cart indications 826 and 726.

In step 612, the reconciled transaction data generation module 224d of the wallet application server 110 generates reconciled transaction data using the information looked up in step 610. Step 612 comprises matching the items of the refund transaction from which are identified in the shopping cart indication 826 with corresponding items in the payment transaction which are identified in the shopping cart indication 726. Thus, in the example described above, the identifier of the second product 726d which is "ID9802" is matched with the product identifier 826b of the shopping cart indication 826 corresponding to the refund transaction which is also "ID9802". The reconciled transaction data generation module 224d of the wallet application server 110 calculates an offset between the amounts associated with matching items in the payment transaction data and the refund transaction data.

Figure 10:
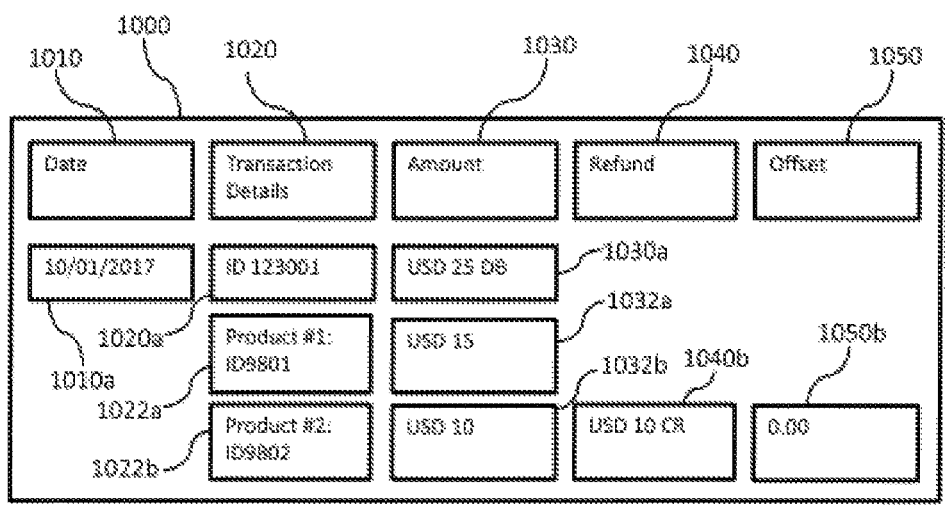
FIG. 10 shows an example of reconciled transaction data generated in accordance with an embodiment of the present invention.

FIG. 10 shows an example of reconciled transaction data generated in accordance with an embodiment of the present invention. As shown in FIG. 10, the reconciled transaction data 100 is organized into columns. The first column is a date column 1010 showing the transaction date, the second column is a transaction details column 1020, the third column is a transaction amount column 1030, the fourth column is a refund column 1040 and the final column is an offset column.

As shown in FIG. 10, the first row of the reconciled transaction data 1000 includes an indication of the date of the original payment transaction 1010a which indicates that the date on which first transaction was carried out on 10 Jan. 2017, the first transaction identifier 1020a shows that the first transaction identifier is "ID 123001", and the first transaction amount 1040a indicates that the amount associated with the first transaction is a debit of USD 25.

The second and third rows of the reconciled transaction data 1000 provide details of the items making up the payment transaction. As shown in FIG. 10, the second row shows the details of the first product and shows the product identifier 1022a of the first product is "ID9801" and the price amount 1032a for the first product is USD 15. The third row shows details of the second product and shows the product identifier 1022b of the second product as "ID9802" and the price amount 1032b for the second product as USD 10.

As shown in FIG. 10, the reconciled transaction data 1000 also includes information on the refund transaction which has been matched to the corresponding item in the payment transaction data. Thus, the third row of the reconciled transaction data 1000 includes an indication of the refund amount 1040a as a credit of USD 10 in the refund column 1040. Further, an offset 1050a between the refund amount 1040a and the amount corresponding to the same item in the original payment transaction data is also shown in the offset column 1050. In this example, the offset 1050a is 0.00 since the refund amount is equal to the corresponding amount for the item in the original payment transaction.

Returning again to FIG. 6, in step 614, the user device interaction module 224e of the wallet application server 110 sends the reconciled transaction data 1000 to the user device 130. Thus, the wallet application 132 can display the reconciled transaction data 1000 to the user 134.

As shown in FIG. 10, the reconciled transaction data 1000 allows the user to easily verify that the correct amount has been refunded since the refund transaction is matched to the original transaction data on an item level.

Figure 11:
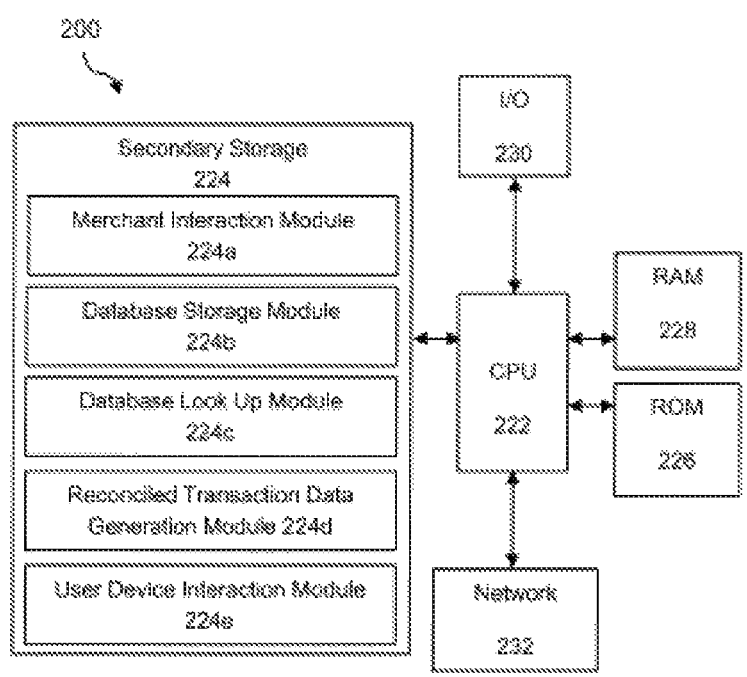
FIG. 11 is a block diagram showing a technical architecture of a wallet application server according to an embodiment of the present invention.

FIG. 11 is a block diagram showing a technical architecture 200 of the wallet application server 110 for performing steps of exemplary methods described above. Typically, the methods are implemented by a number of computers each having a data-processing unit. The block diagram as shown in FIG. 11 illustrates a technical architecture 200 of a computer which is suitable for implementing one or more embodiments herein.

The technical architecture 200 includes a processor 222 (which may be referred to as a central processor unit or CPU) that is in communication with memory devices including secondary storage 224 (such as disk drives), read only memory (ROM) 226, random access memory (RAM) 228. The processor 222 may be implemented as one or more CPU chips. The technical architecture 220 may further comprise input/output (I/O) devices 230, and network connectivity devices 232.

The secondary storage 224 is typically comprised of one or more disk drives or tape drives and is used for non-volatile storage of data and as an over-flow data storage device if RAM 228 is not large enough to hold all working data. Secondary storage 224 may be used to store programs which are loaded into RAM 228 when such programs are selected for execution. In this embodiment, the secondary storage 224 has a merchant interaction module 224a, a database storage module 224b, a database loop up module 224c, a reconciled transaction data generation module 224d and a user device interaction module 224e comprising non-transitory instructions operative by the processor 222 to perform various operations of the method of the present disclosure. As depicted in FIG. 14, the modules 224a-224e are distinct modules which perform respective functions implemented by the wallet application server 110. It will be appreciated that the boundaries between these modules are exemplary only, and that alternative embodiments may merge modules or impose an alternative decomposition of functionality of modules. For example, the modules discussed herein may be decomposed into sub-modules to be executed as multiple computer processes, and, optionally, on multiple computers. Moreover, alternative embodiments may combine multiple instances of a particular module or sub-module. It will also be appreciated that, while a software implementation of the modules 224a-224e is described herein, these may alternatively be implemented as one or more hardware modules (such as field-programmable gate array(s) or application-specific integrated circuit(s)) comprising circuitry which implements equivalent functionality to that implemented in software. The ROM 226 is used to store instructions and perhaps data which are read during program execution. The secondary storage 224, the RAM 228, and/or the ROM 226 may be referred to in some contexts as computer readable storage media and/or non-transitory computer readable media.

The I/O devices may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 232 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 232 may enable the processor 222 to communicate with the Internet or one or more intranets. With such a network connection, it is contemplated that the processor 222 might receive information from the network, or might output information to the network in the course of performing the method operations described herein. Such information, which is often represented as a sequence of instructions to be executed using processor 222, may be received from and outputted to the network, for example, in the form of a computer data signal embodied in a carrier wave.

The processor 222 executes instructions, codes, computer programs, scripts which it accesses from hard disk, floppy disk, optical disk (these various disk based systems may all be considered secondary storage 224), flash drive, ROM 226, RAM 228, or the network connectivity devices 232. While only one processor 222 is shown, multiple processors may be present. Thus, while instructions may be discussed as executed by a processor, the instructions may be executed simultaneously, serially, or otherwise executed by one or multiple processors.

It is understood that by programming and/or loading executable instructions onto the technical architecture 200, at least one of the CPU 222, the RAM 228, and the ROM 226 are changed, transforming the technical architecture 200 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Although the technical architecture 200 is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 200 to provide the functionality of a number of servers that is not directly bound to the number of computers in the technical architecture 200. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

Whilst the foregoing description has described exemplary embodiments, it will be understood by those skilled in the art that many variations of the embodiments can be made in accordance with the appended claims.

The invention claimed is:

1. A data processing system for reconciling transaction data, the data processing system comprising:
a wallet application server operably coupled to a payment transaction database,
the wallet application server comprising:
a computer processor and a data storage device, the data storage device storing instructions operative by the processor to:
receive, via an application programming interface (api) of a merchant server, transaction data indicating a payment transaction;
store the transaction data in the payment transaction database;
receive, via the api of the merchant server, refund transaction data indicating a refund transaction, the refund transaction data comprising an indication of an original transaction and an indication of a refund amount;
look up original transaction data for the original transaction in the payment transaction database;
generate reconciled transaction data from the refund transaction data and the original transaction data, wherein the reconciled transaction data comprises an interactive table showing the original transaction and the refund transaction, wherein the interactive table comprises an offset between the refund transaction data and the original transaction data; and
provide the reconciled transaction data to a user device, wherein the user device has an option to view a link between the original transaction and the refund transaction in the interactive table, and wherein the user device, via a wallet application running on the user device, displays the reconciled transaction data and receives a selection of the option to view the link between the original transaction and the refund transaction in the interactive table.

2. A data processing system according to claim 1, wherein the refund transaction data further comprises an indication of a refunded item, and wherein the original transaction data comprises an indication of purchased items, and wherein the data storage device further comprises instructions operative by the processor to generate the reconciled transaction data from the refund transaction data and the original transaction data by matching the refunded item with a corresponding item from the purchased items.

3. A data processing system according to claim 2, wherein the refund transaction data further comprises an indication of a value associated with the refunded item, and wherein the original transaction data further comprises indications of values associated with each of the purchased items, and wherein the data storage device further comprises instructions operative by the processor to generate reconciled transaction data from the refund transaction data and the original transaction data by calculating an offset between the value associated with the refunded item and the value associated with the corresponding item from the purchased items.

4. A data processing system according to claim 2, wherein the wallet application server is operably coupled to a shopping cart database, wherein the indication of purchased items comprises a shopping cart identifier and wherein the data storage device further comprises instructions operative by the processor to look up, using the shopping cart identifier, product identifiers for the purchased items in the shopping cart database.

5. A data processing system according to claim 1, wherein the wallet application server is operably coupled to a refund transaction database, wherein the data storage device further comprises instructions operative by the processor to store the refund transaction data in the refund transaction database.

6. A data processing system according to claim 5, wherein the wallet application server is operably coupled to a shopping card database, wherein the refund transaction data comprises an indication of a refunded item, and wherein the data storage device further comprises instructions operative by the processor to store an indication of a product identifier for the refunded item with a shopping cart identifier in the shopping cart database and to store an indication of the shopping cart identifier with an indication of the refund transaction in the refund transaction database.

7. A data processing system according to claim 1, wherein the data storage device further comprises instructions operative by the processor to receive, via the api of the merchant server, the original transaction data for the original transaction and to store the original transaction data in the payment transaction database.

8. A data processing method for reconciling transaction data, wherein a wallet application server is operably coupled to a payment transaction database, the method comprising:
receiving, by the wallet application server and via an application programming interface (api) of a merchant server, transaction data indicating a payment transaction;
storing, by the wallet application server, the transaction data in the payment transaction database;
receiving, by the wallet application server and via the api of the merchant server, refund transaction data indicating a refund transaction, the refund transaction data comprising an indication of the payment transaction and an indication of a refund amount;
looking up, by the wallet application server, transaction data for the payment transaction in the payment transaction database;
generating, by the wallet application server, reconciled transaction data from the refund transaction data and the payment transaction data, wherein the reconciled transaction data comprises an interactive table showing the original transaction and the refund transaction, wherein the interactive table comprises an offset between the refund transaction data and the original transaction data; and
providing, by the wallet application server, the reconciled transaction data to a user device, wherein the user device has an option to view a link between the original transaction and the refund transaction in the interactive table; and wherein the user device, via a wallet application running on the user device, displays the reconciled transaction data and receives a selection of the option to view the link between the original transaction and the refund transaction in the interactive table.

9. A data processing method according to claim 8, wherein the refund transaction data further comprises an indication of a refunded item, and wherein the payment transaction data comprises an indication of purchased items, and wherein generating, by the wallet application server, reconciled transaction data from the refund transaction data and the payment transaction data comprises matching, by the wallet application server, the refunded item with a corresponding item from the purchased items.

10. A data processing method according to claim 9, wherein the refund transaction data further comprises an indication of a value associated with the refunded item, and wherein the payment transaction data further comprises indications of values associated with each of the purchased items, and wherein generating, by the wallet application server, reconciled transaction data from the refund transaction data and the payment transaction data comprises calculating, by the wallet application server, an offset between the value associated with the refunded item and the value associated with the corresponding item from the purchased items.

11. A data processing method according to claim 9, wherein the indication of purchased items comprises a shopping cart identifier and wherein the method further comprises looking up, by the wallet application server and using the shopping cart identifier, product identifiers for the purchased items in the shopping cart database.

12. A data processing method according to claim 8, wherein the wallet application server is operably coupled to a refund transaction database, and further comprising storing, by the wallet application server, the refund transaction data in the refund transaction database.

13. A data processing method according to claim 12, wherein the wallet application server is operably coupled to a shopping cart database, wherein the refund transaction data comprises an indication of a refunded item, the method comprising storing, by the wallet application server, an indication of a product identifier for the refunded item with a shopping cart identifier in the shopping cart database and storing, by the wallet application server, an indication of the shopping cart identifier with an indication of the refund transaction in the refund transaction database.

14. A non-transitory computer readable medium carrying computer executable instructions which, when executed by at least one processor of a wallet application server, cause the at least one processor of the wallet application server to perform operations comprising:
- receiving, via an application programming interface (api) of a merchant server, transaction data indicating a payment transaction, wherein the wallet application server is operably coupled to a payment transaction database;
- storing the transaction data in the payment transaction database;
- receiving, via the api of the merchant server, refund transaction data indicating a refund transaction, the refund transaction data comprising an indication of the payment transaction and an indication of a refund amount;
- looking up transaction data for the payment transaction in the payment transaction database;
- generating reconciled transaction data from the refund transaction data and the payment transaction data, wherein the reconciled transaction data comprises an interactive table showing the original transaction and the refund transaction, wherein the interactive table comprises an offset between the refund transaction data and the original transaction data; and
- providing the reconciled transaction data to a user device, wherein the user device has an option to view a link between the original transaction and the refund transaction in the interactive table, and wherein the user device, via a wallet application running on the user device, displays the reconciled transaction data and receives a selection of the option to view the link between the original transaction and the refund transaction in the interactive table.

15. A non-transitory computer readable medium according to claim 14, wherein the refund transaction data further comprises an indication of a refunded item, and wherein the payment transaction data comprises an indication of purchased items, and wherein generating reconciled transaction data from the refund transaction data and the payment transaction data comprises matching the refunded item with a corresponding item from the purchased items.

16. A non-transitory computer readable medium according to claim 15, wherein the refund transaction data further comprises an indication of a value associated with the refunded item, and wherein the payment transaction data further comprises indications of values associated with each of the purchased items, and wherein generating reconciled transaction data from the refund transaction data and the payment transaction data comprises calculating an offset between the value associated with the refunded item and the value associated with the corresponding item from the purchased items.

17. A non-transitory computer readable medium according to claim 15, wherein the wallet application server is operably coupled to a shopping cart database, wherein indication of purchased items comprises a shopping cart identifier and wherein the computer executable instructions, when executed by the at least one processor of the wallet application server, cause the at least one processor of the wallet application server to further perform operations comprising:
- looking up, using the shopping cart identifier, product identifiers for the purchased items in the shopping cart database.

18. A non-transitory computer readable medium according to claim 14, wherein the wallet application server is operably coupled to a refund transaction database, wherein the computer executable instructions, when executed by the at least one processor of the wallet application server, cause the at least one processor of the wallet application server to further perform operations comprising:
- storing the refund transaction data in the refund transaction database.

* * * * *